US009727241B2

(12) United States Patent
Loh et al.

(10) Patent No.: US 9,727,241 B2
(45) Date of Patent: Aug. 8, 2017

(54) MEMORY PAGE ACCESS DETECTION (71) Applicant: Advanced Micro Devices, Inc., Sunnyvale, CA (US)

(72) Inventors: Gabriel H. Loh, Bellevue, WA (US); David A. Roberts, Sunnyvale, CA (US); Mitesh R. Meswani, Austin, TX (US); Mark R. Nutter, Austin, TX (US); John R. Slice, Austin, TX (US); Prashant Nair, Austin, TX (US); Michael Ignatowski, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 148 days.

(21) Appl. No.: 14/616,058

(22) Filed: Feb. 6, 2015

(65) Prior Publication Data

US 2016/0231933 A1 Aug. 11, 2016

(51) Int. Cl.
*G06F 12/10* (2016.01)
*G06F 3/06* (2006.01)
*G06F 12/0893* (2016.01)
*G06F 12/1045* (2016.01)

(52) U.S. Cl.
CPC .......... *G06F 3/0604* (2013.01); *G06F 3/0653* (2013.01); *G06F 3/0673* (2013.01); *G06F 12/0893* (2013.01); *G06F 12/1045* (2013.01); *G06F 2212/60* (2013.01); *G06F 2212/68* (2013.01)

(58) Field of Classification Search
CPC ...... G06F 3/0604; G06F 3/0644; G06F 3/068; G06F 12/0292; G06F 12/08; G06F 2212/205; G06F 3/0653; G06F 12/0895; G06F 2212/7207; G06F 3/0673; G06F 12/1045; G06F 2212/68; G06F 2212/60
See application file for complete search history.

(56) References Cited

U.S. PATENT DOCUMENTS

| 6,347,362 | B1* | 2/2002 | Schoinas | G06F 11/3006 711/147 |
| 2004/0139282 | A1* | 7/2004 | Yoshioka | G06F 12/0238 711/133 |
| 2008/0209104 | A1* | 8/2008 | Tanaka | G06F 3/0605 711/100 |
| 2011/0072234 | A1* | 3/2011 | Chinya | G06F 12/1027 711/207 |
| 2012/0324149 | A1* | 12/2012 | Giganti | G06F 12/0607 711/103 |
| 2013/0024597 | A1 | 1/2013 | Loh | |
| 2014/0237192 | A1* | 8/2014 | Liu | G06F 11/3419 711/135 |

* cited by examiner

*Primary Examiner* — Hashem Farrokh (57) ABSTRACT

A processor maintains a count of accesses to each memory page. When the accesses to a memory page exceed a threshold amount for that memory page, the processor sets an indicator for the page. Based on the indicators for the memory pages, the processor manages data at one or more levels of the processor's memory hierarchy.

20 Claims, 4 Drawing Sheets

MEMORY PAGE ACCESS DETECTION

BACKGROUND

Field of the Disclosure

The present disclosure relates generally to processing systems using paged memory and more particularly to performing memory page accesses at a processor.

Description of the Related Art

To simplify programming and enhance processing efficiency, some processors employ a memory management technique referred to as memory paging. An operating system at the processor assigns an executing program contiguous memory spaces, referred to as memory pages, in a virtual address space. This allows the executing program to address virtual address spaces larger than the physical address space of the processor's system memory, and also isolates the physical address space from other executing programs, thereby simplifying program design. In order to enhance memory access speeds, a processor can move memory pages between different levels of the processor's memory hierarchy. Because of limitations on the physical memory space, movement of a memory page into a given level of the memory hierarchy (e.g., a level 3 (L3) cache) sometimes requires replacement of another memory page at that level. Conventional algorithms for selecting the memory page, such as a least-recently-used (LRU) based selection, often provide sub-optimal results, particularly in situations with variations in how different programs access memory, changes in operating conditions, and other factors.

BRIEF DESCRIPTION OF THE DRAWINGS

The present disclosure may be better understood, and its numerous features and advantages made apparent to those skilled in the art by referencing the accompanying, drawings. The use of the same reference symbols in different drawings indicates similar or identical items.

DETAILED DESCRIPTION

FIGS. 1-6 disclose techniques for managing memory pages at a processor based on threshold numbers of accesses to the memory pages. The processor maintains a count of accesses to each memory page. When the accesses to a memory page exceed a threshold amount for that memory page, the processor sets an indicator for the page. Based on the indicators for the memory pages, the processor determines which memory pages are to be replaced at one or more levels of the processor's memory hierarchy. This allows memory pages to be managed based on the number of times each page is accessed, enhancing processor efficiency.

In some embodiments, the access count for a memory page is maintained at a translation lookaside buffer (TLB) entry for the memory page and the indicator is maintained at a page table entry (PTE) for the memory page. This allows the processor to implement the memory management techniques described herein without substantially altering the page tables or the memory management algorithms based thereon. For example, some processors employ page tables wherein each PTE includes a "referenced" bit that indicates whether the corresponding memory page has been accessed and the processor manages memory pages based on the status of the referenced bits at the page tables. With the techniques described herein, the referenced bit for a PTE can be repurposed as an "accessed" bit that is set only if the corresponding memory page has been accessed the threshold number of times. This effectively changes the memory management algorithms so that they are based on a threshold number of accesses, rather than a single access.

Figure 1:
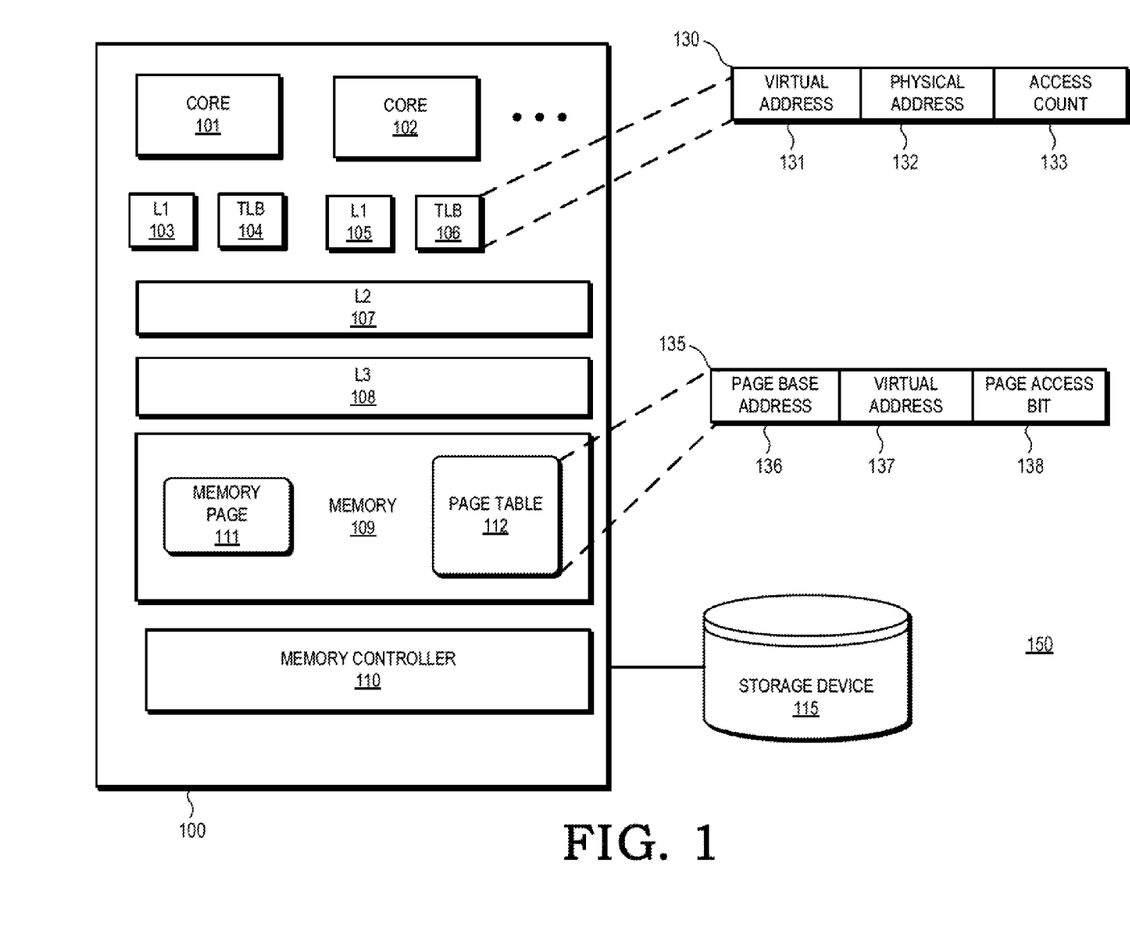
FIG. 1 is a block diagram of a processing system including a processor that manages memory pages based on the number of times each memory page is accessed in accordance with some embodiments.

FIG. 1 illustrates a processing system 150 in accordance with some embodiments. The processing system 150 is generally configured to execute instructions, organized as computer programs on behalf of an electronic device, such as a desktop computer, laptop computer, server, tablet, smartphone, gaining console, and the like. To facilitate execution of instructions, the processing system 150 includes a processor 100 and a storage device 115. The storage device 115 is a non-volatile storage device such as flash memory, a hard disk drive (HDD), solid state disk (SSD), and the like, or a combination thereof. The storage device 115 is generally configured to store data, including computer programs and the data to be accessed by the computer programs, on behalf of the processing system 150.

The processor 100 is a general purpose processor configured to execute the instructions of the computer programs. The processor 100 includes a plurality of processor cores (e.g., processor cores 101 and 102). Each of the processor cores can be one of a central processing unit (CPU), graphics processing unit (GPU), digital signal processor (DSP), field programmable gate array (FPGA), and the like. Each processor core includes one or more instruction pipelines including a corresponding fetch stage to fetch instructions, a decode stage to decode each fetched instruction into one or mode corresponding operations, and one or more execution units to execute the operations.

To assist the processor cores in executing instructions, the processor 100 includes, for each processor core, a corresponding level 1 ("L1") cache and TLB. For example, the processor core 101 is associated with the L1 cache 103 and TLB 104, while the processor core 102 is associated with the L1 cache 105 and the TLB 106. Each L1 cache is employed data (e.g., instructions, operand data) likely to be used by the associated processor core in the near future. Each TLB is employed to store address translation information (e.g., virtual memory addresses and corresponding physical memory addresses) likely to be used by the associated processor core in the near future.

In addition, the processor 100 may include a number of resources shared between two or more of the processor cores, including an L2 cache 107, L3 cache 108, memory 109, and a memory controller 110. The L2 cache 107 stores data for multiple processor cores that is likely to be used by one or more of the processor cores in the near future, wherein the set of data stored at the L2 cache 107 is a superset of the data stored at the L1 caches. Similarly, the L3 cache 108 stores a superset of the data stored at the L2 cache 107. That is, the L3 cache stores copies of the data stored at the L2 cache, and additional data riot stored at the L2 cache 107, that is likely to be used by one or more of the processor cores. In some embodiments, the caches may not be strictly inclusive so that, for example, the L3 cache 108 may not store all of the data stored at the L2 cache 107. The memory 109 represents the system memory for the processor 100, and stores a superset of the data stored at the L3 cache 108, including additional data retrieved from one or more non-volatile storage devices (not shown at FIG. 1). It will be appreciated that the memory 109 is illustrated as a portion of the processor 100 for purposes of description, but that in some embodiments the memory 109 may be external to the processor 100 (e.g., formed in a separate semiconductor die and connected to the processor 100 via one or more external signal lines).

The storage device 115, memory 109, L3 cache 108, L2 cache 107, and L1 collectively form a memory hierarchy for the processor 100. For purposes of description, the storage device 115 is referred to as the highest level of the memory hierarchy, the memory 109 as the next-highest level, the L3 cache 108 as the next-highest level to the memory 109, the L2 cache as the next-highest level to the L3 cache 108, and the L1 caches are referred to as the lowest level of the memory hierarchy. To enhance processing efficiency (e.g., speed of execution of programs at the processor cores) the processor 100 transfers data among the levels of the memory hierarchy so that the lowest level of the hierarchy (the L1 caches) stores data predicted as most likely to be accessed by the corresponding processor core in the near future, with each higher level storing both the data stored at the next-lower level of the memory hierarchy and additional data that is predicted as likely to be accessed by one or more of the processor cores, but predicted as less likely to be accessed than the data stored in the next-lower level of the memory hierarchy. This ensures that, as the predicted likelihood that a particular unit of data is to be accessed increases, that data is moved "closer" in the memory hierarchy to the corresponding processor core, reducing access speed for the data and improving processor efficiency. The predicted likelihood of access for the data can be based on the data itself being accessed, based on observed patterns of accesses, and the like.

As a consequence of data being moved into a given level of the memory hierarchy of the processor 100, other data must sometimes be evicted from the memory hierarchy level to make room for the data being moved in. The movement of data between levels of the memory hierarchy and selection of data for eviction resulting from this movement is generally referred to as "data management" or "managing data" at the processor 100. To facilitate both data management, the processor 100 can execute an operating system (OS) that implements memory paging for executing programs. To do so, the OS assigns an executing program contiguous memory spaces, referred to as memory pages, in a virtual address space. To access data, the executing program generates a memory access request (e.g., a read request or a write request) including the virtual address of the data targeted by the memory access request. The OS maintains a set of page tables (e.g., page table 112) that map virtual addresses to the physical address of the memory page that stores the data. The OS uses the page tables to translate the virtual address of a memory access request to its corresponding physical address, and provides the physical address and memory access request to the memory controller 110, which executes the memory access request at the memory hierarchy of the processor 100.

The processor 100 employs the TLBs to assist in translation of virtual addresses to physical addresses. In particular, each TLB stores, for its corresponding processor core, the virtual addresses and corresponding physical addresses for recent memory access requests generated at the corresponding processor core. In response to a memory access request, the processor identifies whether the virtual address of the request is stored at an entry of the corresponding TLB and if so (a "TLB hit") translates the virtual address to the physical address indicated by the entry. If the TLB does not store the virtual address (a "TLB miss"), a memory management unit (not shown) of the processor 100 accesses the page tables (referred to as a "table walk") to identify the physical address for the virtual address. The processor 100 also transfers the virtual and physical address to an entry of the TLB.

The processor 100, in conjunction with the OS, employs the TLBs and page tables to facilitate data management at the memory hierarchy. To illustrate, each TLB entry corresponds to a different memory page. For example, TLB 106 includes a TLB entry 130 corresponding to memory page 111. Each TLB entry includes a virtual address field (e.g., virtual address field 131) indicating the virtual address for the corresponding memory page and a physical address field (e.g., physical address field 132) indicating the physical address for the memory page. In some embodiments, each virtual address is composed of a virtual base address and an offset, and each physical address is composed of a physical base address and an offset, wherein the offset for the virtual address and the offset for the physical address are the same. In such cases, the virtual address field and the physical address field store the virtual base address and physical base address for the corresponding memory page, allowing the TLB entry to include only one entry for a given memory page. It will be appreciated that each TLB entry can include additional fields not explicitly illustrated at FIG. 1.

Each TLB entry also includes storage locations to store an access count field (e.g., access count field 133) indicating a number of accesses to the corresponding memory page. In operation, the memory controller 110 monitors accesses to the TLBs of the processor 100. In response to a TLB hit on a given entry, indicating a request to access the corresponding memory page memory page, the memory controller 110 adjusts the corresponding access count field. The access count field thus indicates a number of times that the corresponding memory page was accessed. In some embodiments, the memory controller 110 adjusts the access count field only in response to designated characteristics of the memory page, such as whether the memory page is stored at a given level of the memory hierarchy. For example, in some embodiments the memory controller 110 adjusts the access count field for a TLB entry only when both 1) a TLB hit on the entry is indicated; and 2) the corresponding data is not stored at the L3 cache 108. Accordingly, under these conditions the access count field indicates the number of accesses to the corresponding memory page that required the memory page to be accessed from the memory 109. It will be appreciated that, in some embodiments, logic separate from the memory controller 110 can adjust the access count field. In some embodiments, the field can be adjusted by incrementing the stored value. In some embodiments, adjusting can include decrementing the field from an initial value, and identifying that the field has reached the threshold when the value reaches zero (or another predetermined value).

In some embodiments, the memory controller 110 adjusts the access count field by different amounts for different types of memory accesses to the memory page. For example, the memory controller 110 can adjust the access count field for read accesses by one amount and adjust the access count field for write accesses by a different amount. The access count field will thus represent a weighted sum of accesses to the corresponding memory page as indicated by the following adjustment function:

Access Count=Num_Num Reads*Weight_Reads+
Num_Writes*Weight_Writes where Num_Reads is the number of read accesses to the memory page, Weight_Reads is the amount by which the access count field is adjusted for each read access. Num_Writes is the number of write accesses to the memory page, and Weight_Writes is the amount by which the access count field is adjusted for each write access. In some embodiments, the Weight_Reads and Weight_Writes values are programmable values that can be adjusted by a user based on observed behavior of a program executing at the processor 100. In some embodiments, the processor 100 can employ different adjustment functions (e.g., different weights) for different memory pages.

The access count field is used to designate whether each memory page is in an "accessed" state or a "non-accessed" state, and these states are used by the OS for data management. To illustrate, the page tables include a number of entries, with each entry corresponding to a different memory page. For example, page table 112 includes a page table entry (PTE) 135 corresponding to memory page 111. Each PTE includes a page base address field 136, indicating the base physical address for the corresponding memory page, a virtual address field 137, indicating the base virtual address for the corresponding memory page, and a page access bit 138. It will be appreciated that each TLB entry can include additional fields not explicitly illustrated at FIG. 1.

The page access bit 138 indicates whether the corresponding memory page is in the accessed state or the non-accessed state. In operation, the page access bit for each PTE is initialized to the non-accessed state. In response to the access count field of a TLB entry exceeding a corresponding threshold, the memory controller 110 sets the page access bit at the corresponding PTE to the accessed state to indicate that the corresponding memory page has been accessed at least the threshold number of times.

In operation, the OS executing at the processor 100 can manage data at the memory hierarchy based on the status of the page access bits at the page tables. For example, when the OS determines that a page is to be evicted from the memory 109 to the storage device 115, it can prioritize those memory pages whose page access bits are in the accessed state. That is, the memory pages that have been accessed a threshold number of times are less likely to be evicted from the memory 109 than pages that have been accessed less than the threshold number of times. Further, the threshold number can be set so that multiple accesses to a memory page are required before that page is prioritized at the memory 109, potentially enhancing processor efficiency. To illustrate via an example, some conventional processors set a reference bit at a PTE of a memory page in response to a single access to the memory page. When selecting, a page for eviction at the memory 109, the processors do not differentiate between memory pages with set reference bits. Accordingly, a page that has been accessed, for example, twenty times, is treated the same, for eviction purposes, as a page that has been accessed only once. By setting the access threshold for the memory pages at a sufficiently high level (e.g., 10 accesses), the processor 100 ensures that memory pages that have a larger number of accesses are prioritized to be maintained at the memory over memory pages having less than the threshold number of accesses. In addition, because the access count is maintained at the TLBs rather than at the PTEs of the processor 100, the OS and its memory management techniques do not have to be substantially altered in order to implement the techniques described herein.

Figure 2:
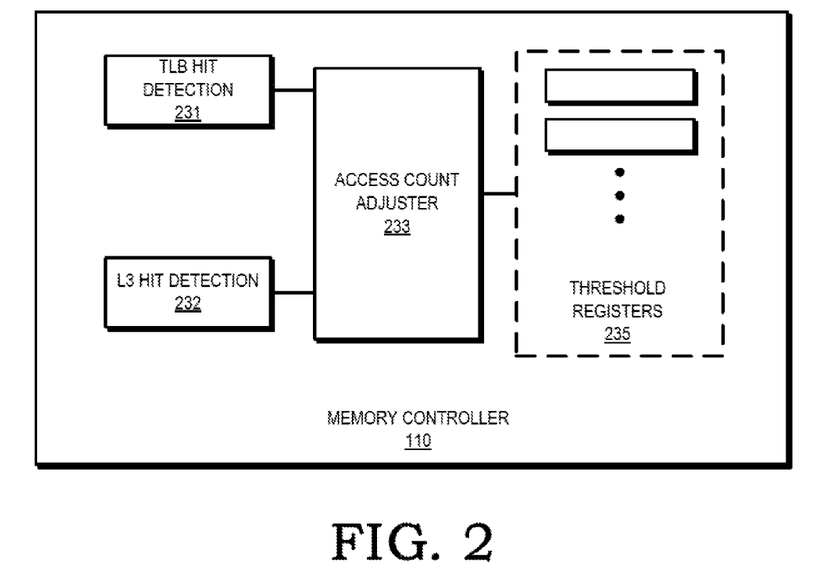
FIG. 2 is a block diagram of the memory controller of FIG. 1 implementing different access threshold registers for different memory pages in accordance with some embodiments.

FIG. 2 illustrates a block diagram of the memory controller 110 in accordance with some embodiments. The memory controller 110 includes a TLB hit detection module 231, an L3 hit detection module 232, an access count adjuster 233, and threshold registers 235. The TLB hit detection module 231 is configured to identify hits (i.e. that a received address is stored) at entries of the TLBs of the processor 100. Similarly, the L3 hit detection module 232 is configured to identify hits (i.e. that data corresponding to a received address is stored) at entries of the L3 cache 108 (FIG. 1).

The threshold registers 125 store threshold values corresponding to memory pages of the processor 100. The threshold values indicate the number of times that a memory page must be accessed at a TLB, when the corresponding data is not present at the L3 cache 108, for the corresponding PTE to have its access bit set. That is, the threshold values indicate the number of times a memory page must be accessed before it is prioritized to be maintained at the memory 109. In some embodiments, each threshold register corresponds to a different memory page. In other embodiments, each threshold register of the threshold registers 125 can correspond to a group of memory pages. The threshold registers 125 can be programmable registers that are exposed (able to be programmed by) an operating system or application program. This allows the operating system or application program (or the programmers thereof) to tune the thresholds for different memory pages differently, thereby effectively changing the likelihood that each memory page will be prioritized to be maintained at the memory 109. For example, if a given memory page is known to the programmer to be data likely to be accessed frequently, the threshold register for the memory page can be programmed with a relatively low value, so that the memory page is more likely to be maintained at the memory 109. In contrast, if a different memory page is known to the programmer to be data likely to be accessed less frequently, the threshold register for the memory page can be programmed with a relatively high value, so that the memory page is more likely to be replaced at the memory 109.

The access count adjuster 233 is configured to receive signals from the TLB hit detection module 231 and the L3 hit detection module 232 indicating TLB and L3 hits respectively. In response to an indication that a TLB entry for a memory page has been hit, the access count adjuster 233 determines whether the memory access that caused the TLB hit also caused a cache hit at the L3 cache 108. If not (that is, if the memory access caused a cache miss at the L3 cache 108), the access count adjuster 233 increments the access count field at the TLB entry. The access count adjuster 233 then determines if the access count for the TLB entry exceeds the threshold value stored at the corresponding register of the threshold registers 235. If so, the access count adjuster 233 sets the page access bit at the PTE for the memory page to indicate that the page is in the accessed state.

In some embodiments, the OS executing at the processor 100 manages eviction of cache lines at the memory 109. In response to determining that a memory access request requires moving a memory page to the memory 109, and that the memory 109 does not have an unused block available to store the incoming page, the OS identifies a memory page to be evicted and replaced by the incoming page. In some embodiments, the OS first identifies which memory pages at the memory 109 have corresponding PTEs with unset (e.g., negated) page access bits. For purposes of description, these memory pages are referred to as de-prioritized memory pages and memory pages having PTEs with set page access bits are referred to as prioritized memory pages. The OS selects one of the de-prioritized memory pages for replacement based on the memory page replacement scheme of the OS. A prioritized memory page is not selected for replacement unless the memory 109 does not store any de-prioritized memory pages, in which case the least recently used prioritized memory page is selected for replacement. It will be appreciated that the OS can use other memory page replacement schemes that take the status of the page access bit into account without necessarily maintaining all prioritized memory pages over all de-prioritized memory pages. For example, the OS can combine the status of the page access bit with other heuristics to determine which memory pages are to be replaced.

Figure 3:
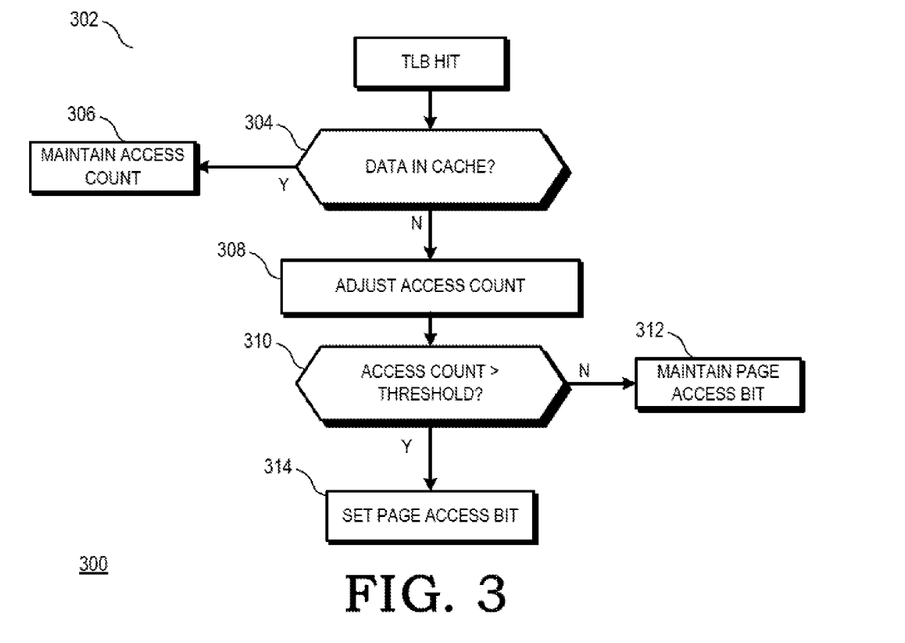
FIG. 3 is a flow diagram of a method of managing memory pages at a processor based on the number of times each memory page is accessed in accordance with some embodiments.

FIG. 3 illustrates a flow diagram of a method 300 of managing memory pages at the processor 100 based on the number of times each memory page is accessed in accordance with some embodiments. At block 302, a memory access request results in a TLB hit, which is indicated by the TLB hit detection module 231 (FIG. 2). In response, the access count adjuster 233 determines whether the memory access request causes a hit in the L3 cache 108. If so, the method flow moves to block 306 and the access count adjuster 233 maintains (does not change) the access count field at the TLB entry that indicated the TLB hit.

Returning to block 304, if the memory access request results in a miss at the L3 cache 108, the method flow moves to block 308 and the access count adjuster 233 adjusts the access count field at the TLB entry that indicated the TLB hit. As described above, the amount by which the access count field is adjusted can be different based on the type of memory access request, the memory page corresponding to the TLB entry, and the like. At block 310 the access count adjuster 233 identifies Whether the adjusted access count field exceeds the threshold stored at the threshold register corresponding to the memory page. If not, the method flow moves to block 312 and the access count adjuster 233 maintains (does not change) the page access hit at the PTE entry for the memory page. If, at block 310, the access count adjuster 233 determines that the access count field exceeds the threshold value, the method flow moves to block 314 and the access count adjuster 233 sets the page access bit at the PTE entry for the memory page. As described above, the OS determines which pages to replace at the memory 109 based on the state of the page access bits at the page tables 112.

Figure 4:
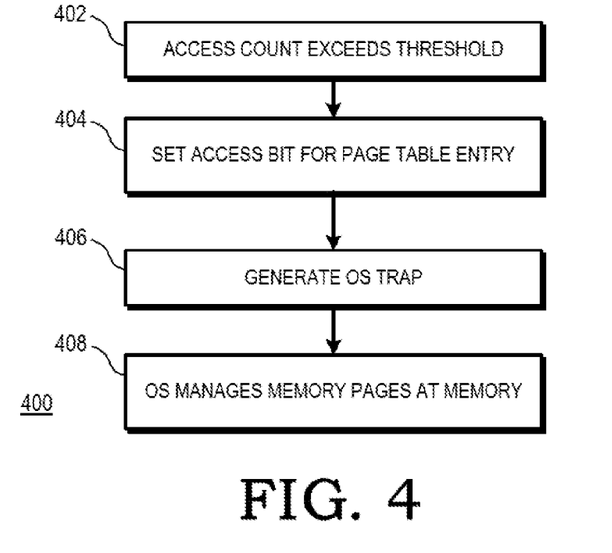
FIG. 4 is a flow diagram of a method of indicating a memory page has been accessed via a software trap in accordance with some embodiments.

FIG. 4 is a flow diagram of a method 400 of indicating a memory page has been accessed via a software trap at the processor 100 in accordance with some embodiments. At block 402 the access count adjuster 233 determines that an access count field for a memory page exceeds its corresponding threshold. In response, at block 404, the memory controller 110 sets the access bit at the PTE for the memory page. This triggers, at block 406, an OS trap that suspends execution of an application program at one or more of the processor cores of the processor 100, and causes execution of the OS at the one or more processor cores. At block 408, the executing OS manages memory pages at the memory 109 based on the set access hit. By employing an OS trap in response to setting the page access bit, rather than waiting for the OS to resume execution at a later time, memory pages are managed more quickly in response to a change in status, improving memory management and processing efficiency.

Figure 5:
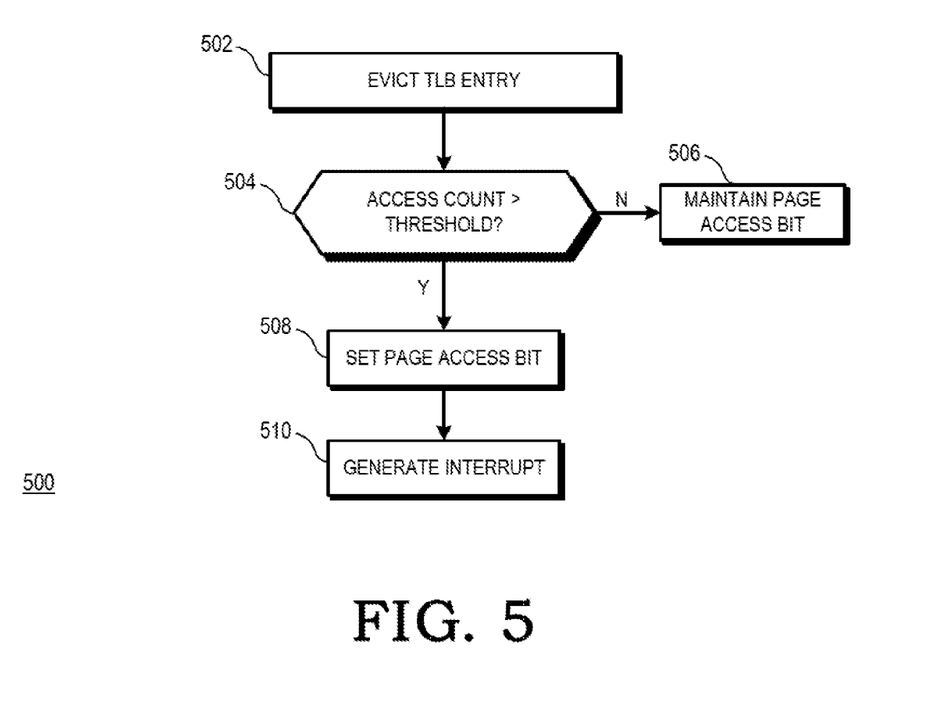
FIG. 5 is a flow diagram of a method of indicating a memory page has been accessed by triggering an interrupt in response to eviction of a translation lookaside buffer entry in accordance with some embodiments.

FIG. 5 is a flow diagram of a method of indicating a memory page has been accessed by triggering an interrupt in response to eviction of a translation lookaside buffer entry at the processor 100 in accordance with some embodiments. At block 502 the memory controller 110 designates an entry of a TLB of the processor 100 for eviction, to be replaced by a different set of addresses for a different memory page. In response, at block 504 the memory controller 110 determines whether the access count field for the TLB entry designated for eviction exceeds the corresponding threshold at the threshold registers 235. If not, the memory controller 110 maintains (does not change) the page access bit at the PTE entry for the memory page. If, at block 504, the access count field for the TLB entry designated for eviction does exceed the corresponding threshold, the method flow moves to block 508 and the memory controller 110 sets the page access bit at the PTE entry for the memory page. At block 510, the setting of the page access bit triggers an interrupt at the processor 100. The interrupt handler can in turn trigger management of memory pages at the memory 109 based on the set status bit. By triggering an interrupt in response to the page access bit being set, rather than waiting for the OS to resume execution at a later time, memory pages are managed more quickly in response to a change in status, improving memory management and processing efficiency.

In some embodiments, the apparatus and techniques described above are implemented in a system comprising one or more integrated circuit (IC) devices (also referred to as integrated circuit packages or microchips), such as the processor described above with reference to FIGS. 1-5. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 6:
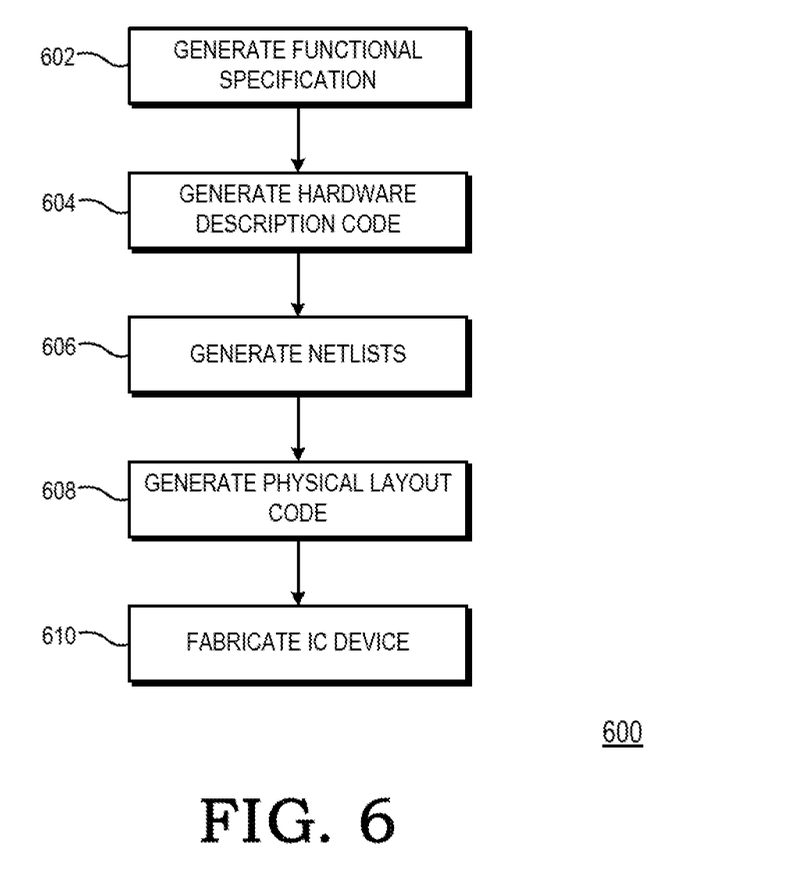
FIG. 6 is a flow diagram illustrating a method for designing and fabricating an integrated circuit device implementing, at least a portion of a component of a processing system in accordance with some embodiments.

FIG. 6 is a flow diagram illustrating an example method 600 for the design and fabrication of an IC device implementing one or more aspects in accordance with some embodiments. As noted above, the code generated for each of the following processes is stored or otherwise embodied in non-transitory computer readable storage media for access and use by the corresponding design tool or fabrication tool.

At block 602 a functional specification for the IC device is generated. The functional specification (often referred to as a micro architecture specification (MAS)) may be represented by any of a variety of programming languages or modeling languages, including C, C++, SystemC, Simulink, or MATLAB.

At block 604, the functional specification is used to generate hardware description code representative of the hardware of the IC device. In some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 606 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 608, one or more EDA tools use the netlists produced at block 606 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 610, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, of solution to occur or become more pronounced are not to be construed as a critical, required, or essential feature of any of all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   adjusting, at a processor, a first access count in an entry of a translation lookaside buffer (TLB) of a processor for each access of a first plurality of accesses to a first memory page;
   in response to the first access count exceeding a first threshold, setting a first indicator in an entry of a page table of the memory page corresponding to the TLB entry; and
   managing data in the memory associated with the processor based on the first indicator.

2. The method of claim 1, wherein managing data comprises:
   prioritizing each memory page having a corresponding first indicator that is set; and
   identifying a memory page for eviction based on the prioritization.

3. The method of claim 2, wherein each access of the first plurality of accesses comprises one of a memory read request or a memory write request.

4. The method of claim 1, wherein adjusting the first access count comprises adjusting the first access count in response to the access to the entry of the TLB and in response to identifying a cache miss at the processor.

5. The method of claim 1, wherein:
   the first plurality of accesses comprises a read access and a write access; and
   adjusting the first access count comprises:
      adjusting the first access count by a first amount in response to the read access; and
      adjusting the first access count by a second amount in response to the write access, the first amount different from the second amount.

6. The method of claim 1, further comprising:
   adjusting at the processor a second access count in an entry of the TLB each access of a second plurality of accesses to a second memory page associated with the processor;
   in response to the second access count exceeding a second threshold, setting a second indicator in the entry of a page table of the memory page corresponding to the TLB entry; and
   managing data in the memory associated with the processor based on the first indicator and the second indicator.

7. The method of claim 6, wherein:
   adjusting the first access count comprises adjusting the first access count based on a first adjustment function; and
   adjusting the second access count comprises adjusting the second access count based on a second adjustment function different from the first adjustment function.

8. The method of claim 6, wherein the second threshold is different from the first threshold.

9. The method of claim 1, further comprising:
   in response to the first indicator being set, initiating a software trap at the processor.

10. The method of claim 1, further comprising:
    in response to the first indicator being set, initiating an interrupt at the processor.

11. A method, comprising:
    in response to an access to an entry of a translation lookaside buffer (TLB) of a processor, adjusting an access count of the TLB to indicate access a first memory page associated with the entry of the TLB;
    in response to the access count of the first memory page exceeding a threshold, setting an indicator in an entry of a page table of the first memory page; and
    managing data at a memory of the processor based on the indicator.

12. The method of claim 11, wherein managing data at the memory of the processor comprises selecting a second memory page for eviction in response to the indicator being set.

13. The method of claim 11, wherein setting the indicator comprises setting a bit at the entry of the page table corresponding to the first memory page.

14. A processor, comprising:
    a first storage location to store a first access count indicating a first plurality of accesses to a first memory page;
    a second storage location to store a first indicator for the first memory page; and
    a controller to set the first indicator for the first memory page in response to the first access count exceeding a first threshold, the processor to manage data stored at a memory associated with the processor based on the first indicator.

15. The processor of claim 14, wherein:
    the first storage location is a portion of an entry of a translation lookaside buffer (TLB) of the processor, the entry associated with an address corresponding to the first memory page; and
    the second storage location is a portion of a page table entry for the first memory page.

16. The processor of claim 15, wherein the controller is to adjust the first access count in response to the access to the entry of the TLB.

17. The processor of claim 16, wherein the controller is to adjust the first access count in response to an access to the entry of the TLB and in response to identifying a cache miss at the processor.

18. The processor of claim 15, wherein:
    the first plurality of accesses comprises a read access and a write access; and
    the controller is to:
    adjust the first access count by a first amount in response to the read access; and
    adjust the first access count by a second amount in response to the write access, the first amount different from the second amount.

19. The processor of claim 14, further comprising:
    a third storage location to store a second access count indicating a second plurality of accesses to a second memory page;
    a fourth storage location to store a second indicator for the second memory page; and
    wherein the controller is to set the second indicator for the second memory page in response to the second access count exceeding a second threshold and is to manage data stored at the memory associated with the processor based on the second indicator.

20. The processor of claim 19, wherein the controller is to:
adjust the first access count based on a first adjustment function; and
adjust the second access count based on a second adjustment function different from the first adjustment function.

* * * * *